United States Patent
Chen et al.

(10) Patent No.: US 7,831,798 B2
(45) Date of Patent: Nov. 9, 2010

(54) METHOD TO ACHIEVE PARTIAL STRUCTURE ALIGNMENT

(75) Inventors: Wang Dong Chen, Toronto (CA); Ying Chau Raymond Mak, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/856,991

(22) Filed: Sep. 18, 2007

(65) Prior Publication Data

US 2009/0077342 A1 Mar. 19, 2009

(51) Int. Cl.
*G06F 9/26* (2006.01)
(52) U.S. Cl. ...................................... 711/201; 711/202
(58) Field of Classification Search ................... None
See application file for complete search history.

(56) References Cited

U.S. PATENT DOCUMENTS

| | | | |
|---|---|---|---|
| 5,933,830 A | 8/1999 | Williams | |
| 6,145,017 A * | 11/2000 | Ghaffari | 710/5 |
| 6,820,195 B1 * | 11/2004 | Shepherd | 712/300 |
| 2005/0177822 A1 | 8/2005 | Kuch et al. | |
| 2005/0251642 A1 * | 11/2005 | Niell et al. | 711/201 |

OTHER PUBLICATIONS

Pantel et al., "Data Alignment and Integration", Computer, vol. 38, No. 12, Dec. 2005, pp. 43-50.

\* cited by examiner

*Primary Examiner*—Than Nguyen
(74) *Attorney, Agent, or Firm*—Yee & Associates, P.C.; David A. Mims, Jr.

(57) ABSTRACT

A computer-implemented method including receiving a set of data having a mapping. The set of data has groups of subsets of data. The mapping describes in what order the groups of subsets of data are to be stored in a memory. The mapping also describes the offsets of the groups of subsets of data in the memory. The mapping is not changed when the set of data is stored in the memory. The method also includes determining a starting address for the set of data. The starting address corresponds to an address in the memory. The starting address is determined such that an optimum number of subsets of data in the groups of subsets of data are aligned. The method also includes storing the set of data in the memory, wherein the mapping is unaffected when the set of data is stored in the memory.

19 Claims, 6 Drawing Sheets

```
struct A{
    char m1;
    int m2;
}x;
```

METHOD TO ACHIEVE PARTIAL STRUCTURE ALIGNMENT

BACKGROUND OF THE INVENTION

1. Field of the Invention

The present invention relates generally to an improved data processing system and in particular to a method and apparatus for storing data. More particularly, the present invention relates to a computer implemented method, apparatus, and a computer usable program product for storing partially aligned data.

2. Description of the Related Art

Gating circuitry on a computer chip between registers inside the CPU and the address bus gives preference to certain locations in memory where access to the data is most efficient. If a particular register type, such as a floating point register, is used to load data from memory, the data should start only at certain addresses if access efficiency is to be maximized. The reason for this fact is that the connection of the registers to the address bus often ignores certain low order bits in order to reduce the number of gates. Accordingly, the register is blind to certain address locations within a memory. The blind spot can be different for different register types. In some cases, extra processor cycles are needed to access data lying in portions of memory to which the registers are blind. In some other cases, access to the blind spots in the memory is prohibited.

A set of data is usually stored in chunks, or subsets, of data. Each subset of data is stored at particular addresses within the memory. As used herein, a "set of data" is a contiguous sequence of data bytes. A "subset of data" is a contiguous sub-sequence of data bytes within a set of data. In contemporary programming languages, such as C and C++, a "set of data" is represented by a data structure, and a "subset of data" is represented by members within a data structure.

A set of data is aligned if no portion of a subset of the data is located in a blind spot in the memory. Likewise, a subset of data is aligned if no portion of the subset of data is located in a blind spot in the memory. A set of data is unaligned if any portion of any subset of data is located in a blind spot in the memory. A set of data is partially aligned if that set of data includes at least one subset of data for which no portion of that subset is in a blind spot of the registers of the central processing unit. A set of data is poorly partially aligned if relatively few subsets of data of a set of data are aligned. A set of data is partially aligned well if relatively many subsets of data of a set of data are aligned.

In terms of high level programming languages, the phenomenon of blind spots in a memory for a processor can lead to requirements or restrictions on how variables defined in the programming language are best allocated in memory. These requirement or restrictions can be referred to as an alignment paradigm. The alignment paradigm is specific to the processor architecture of the computer being used.

Because lower order lines are ignored by addressing, alignment usually manifests itself as aligning data on multiple powers of two. Optimizing compilers for high level languages often take into account this fact when allocating variables.

Traditionally, alignment of all subsets of data is achieved by assuming the base address of the structure is zero, mapping the next subset of data onto the next available non-blind spot in memory, and then leaving gaps within the structure, if needed. When allocating the structure variable, the structure variable is aligned according to the most stringent requirements of all subsets of data. All subsets of data will then be aligned properly. The set of data is then aligned, resulting in maximum processor efficiency when accessing the set of data or any subset of data.

A structure or structure variable is a contiguous data block in memory. The block is divided into data fields called members. In this description, the data block is also referred to as set of data, and the data field as a subset of data.

However, this method of storing data is not always possible or desirable. For example, when a set of data is transported over a network the set of data is often compacted as tightly as possible. Data compacted for transfer over a network is most often poorly partially aligned and is sometimes unaligned. Additionally, when data is exchanged between two processes running on two different hardware architectures, the data must be organized or stored according to predetermined methods.

As a result, the set of data may be poorly partially aligned. Accordingly, a process may function less efficiently or not at all. As a result, performance of a process, software, or machine, in terms of the time required to execute a process, can be substantially reduced, often by a factor of ten or more.

SUMMARY OF THE INVENTION

Illustrative embodiments provide for a computer-implemented method, an apparatus and computer program product. An exemplary method includes receiving a set of data having a mapping. The set of data has groups of subsets of data. The mapping describes in what order the groups of subsets of data are to be stored in a memory. The mapping is not changed when the set of data is stored in the memory. The mapping further describes offsets of the groups of subsets of data in the memory. The method also includes determining a starting address for the set of data. The starting address corresponds to an address in the memory. The starting address is determined such that an optimum number of subsets of data in the groups of subsets of data are aligned. As used herein, the term "optimum number of subsets of data in the subsets of data are aligned" refers to an alignment that is a solution to equations (1) and (2) described herein. In some instances, an "optimum number" means that the maximum possible number of subsets of data are aligned. In other instances, an "optimum number" means that fewer than a maximum possible number of subsets of data are aligned, but where certain frequently accessed frequently accessed subsets of data are preferentially aligned. The method also includes storing the set of data in the memory, wherein the mapping is unaffected when the set of data is stored in the memory.

In another illustrative example, this method further includes determining the starting address for the set of data such that at least one frequently-accessed subset of data will be aligned. In this case, the at least one frequently-accessed subset of data comprises at least one subset of data in the plurality of subsets of data.

In another illustrative example, the starting point address is determined according to the equation $B=b+n*A$ for $n=1, 2, 3 \ldots$. In this case, B is a determined starting address, b is an initial starting address, n is an integer, and A is a least common multiple of all alignments of the subsets of data.

In another illustrative example, the set of data comprises a member of an array. In another illustrative example, the method further includes adding additional data to the set of data such that a size of the set of data is a multiple of A. In this case, if the set of data is a member of an array, and if the first member of the array satisfies the equation $B=b+n*A$ for $n=1, 2, 3 \ldots$, then all members in the array would also satisfy this equation. In other words, all array members would have the same alignment property as the first member.

In another illustrative example, a determination is made whether the start address of the set of data is less than the least common multiple. Responsive to the start address being less than the least common multiple, the start address is incremented by 1 to form an incremented start address, and the cost of access using this incremented start address is determined. This process of incrementing the start address, and calculating the access cost, is repeated until the incremented start address is greater than or equal to the least common multiple. A series of access costs associated with each starting address from zero to less than the least common multiple is thus determined. The starting address corresponding to the least cost is then determined. This starting address is then used as the initial starting address b in the equation $B=b+n*A$ for $n=1, 2, 3 \ldots$. Using this equation, all addresses, B, in memory which give the least access cost are determined.

In another illustrative example, the cost is associated with an error for each subset of data according to the equation $e_i =$ remainder of $(b+\text{offset}_i)/\text{align}_i$. In this case, $e_i$ is an error associated with a subset of data, b is a current starting address in the method. The values of $\text{offset}_i$ and $\text{align}_i$ are determined according to a mapping associated with the set of data and data types associated with the set of data. The term "subset of data" can also be referred to as "member."

In another illustrative example, the method further includes, before the step of computing a cost, and responsive to $e_i$ being non-zero, setting a variable $s_i=1$, wherein $s_i$ is a slag variable. The cost is computed according to the equation $c=s_1*w_1+s_2*w_2+\ldots s_i*w_i$, wherein c is the cost and $w_i$ is a weight variable for an $i^{th}$ member.

In another illustrative example, the method further includes, before the step of computing a cost, and responsive to $e_i$ being zero, setting a variable $s_i=0$, wherein $s_i$ is a slag variable. The cost is computed according to the equation $c=s_1*w_1+s_2*w_2+\ldots s_i*w_i$, wherein c is the cost and $w_i$ is a weight variable for an $i^{th}$ member.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments address a known alignment constraint problem when storing heterogeneous data structures or sets of data, the data structures being made of variables of different types. The performance penalty imposed on a central processing unit for violating these constraints can be significant. As a result of the alignment constraints, the resulting data structure can include "spaces" in memory. In some cases, compacting the data structure is desirable or necessary to eliminate these spaces so that the data structure occupies contiguous memory. However, compacting the data structure results in a performance penalty.

Illustrative embodiments address this problem by using an address determiner to calculate an optimal memory position for the compacted data structure such that the total performance loss associated with the misalignment is reduced. Illustrative embodiments further address this problem as described herein.

Figure 1:
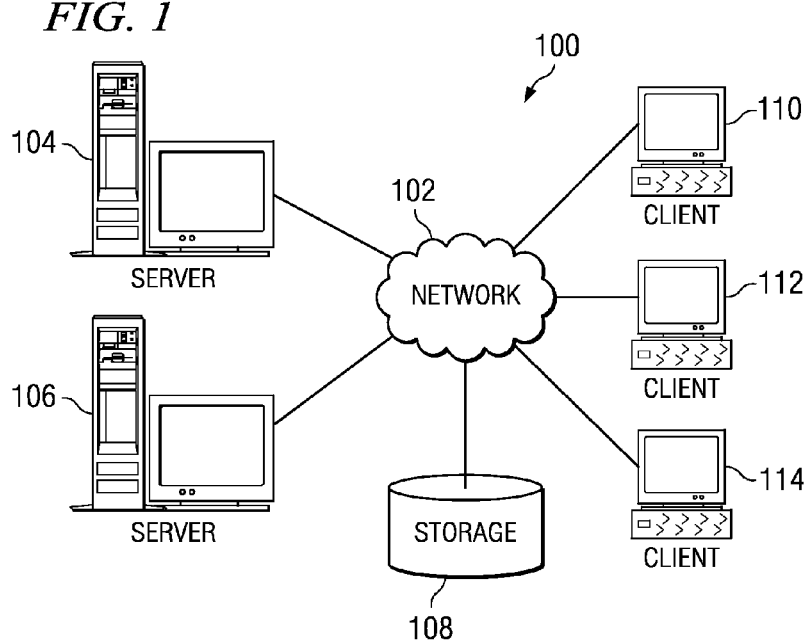
FIG. 1 is a pictorial representation of a network of data processing systems in which illustrative embodiments may be implemented.
Figure 2:
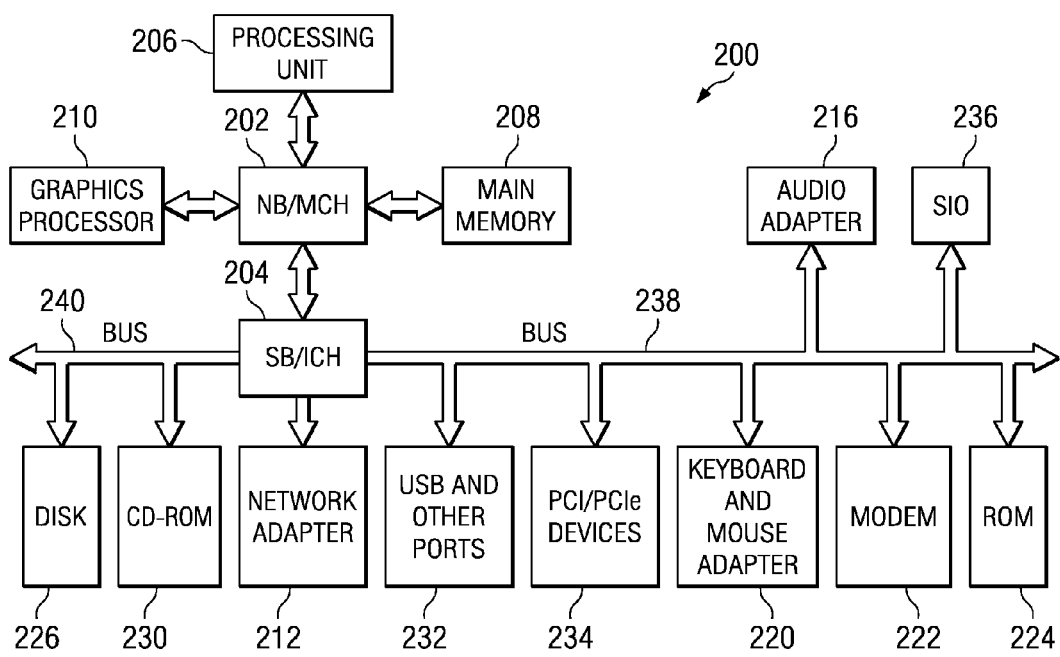
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 is a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide for a computer-implemented method. The method includes receiving a set of data having a mapping. The set of data is made of a number of subsets of data. The mapping describes in what order the subsets of data are to be stored in a memory. The mapping further describes offsets of the groups of subsets of data in the memory. The mapping is not changed when the set of data is stored in the memory. The method also includes determining a starting address for the set of data. The starting address corresponds to an address in the memory. The starting address is determined such that an optimum number of subsets of data in the subsets of data are aligned. The method also includes storing the set of data in the memory.

As used herein, the term "optimum number of subsets of data in the subsets of data are aligned" refers to an alignment that is a solution to equations (1) and (2). In some instances, an "optimum number" means that the maximum possible number of subsets of data are aligned. In other instances, an "optimum number" means that fewer than a maximum possible number of subsets of data are aligned, but where certain frequently accessed subsets of data are preferentially aligned. A subset of data is aligned if no portion of the subset of data is located in a blind spot in the memory. A set of data is aligned if no portion of a subset of the data is located in a blind spot in the memory. A location in a memory is a blind spot if registers of an associated central processing unit preferentially do not access the location in the memory.

Other illustrative embodiments provide for a computer-implemented method for performing partial alignment of a set of data within a memory. A set of data is partially aligned if that set of data includes at least one subset of data for which no portion of that subset is in a blind spot of the registers of the central processing unit. In an illustrative method, a start address of the set of data to be stored in a memory is set to zero. The start address is the first address in a memory for a set od data.

A least common multiple of all alignments of all members is determined. A member is a subset of data in the set of data. An offset of a member within a data structure, or of a subset of data within a set, is the distance between the beginning location of the member and the starting address of the whole data structure. Thus, the offset is measured from the beginning of the whole data structure.

A cost of unaligned access of the set of data is computed. A cost is an amount of additional processor resources that are required for the processor to access an unaligned set of data. Unaligned access is access by a processor to a portion of a memory which is blind to one or more registers of the processor.

Responsive to the cost of unaligned access being more than a maximum cost of unaligned access, the start address is incremented to form an incremented start address. A start address is incremented if the start address is increased. A start address can be incremented by 1 or by another positive integer.

Responsive to the incremented start address being less than the least common multiple, the incremented start address is used to compute the access cost. This process of incrementing the start address and computing the access cost is repeated until the incremented start address is greater than or equal to the least common multiple. A series of access costs corresponding to start addresses from zero to less than the least common multiple is computed. The start address corresponding to the least access cost is thus determined.

Figure 3:
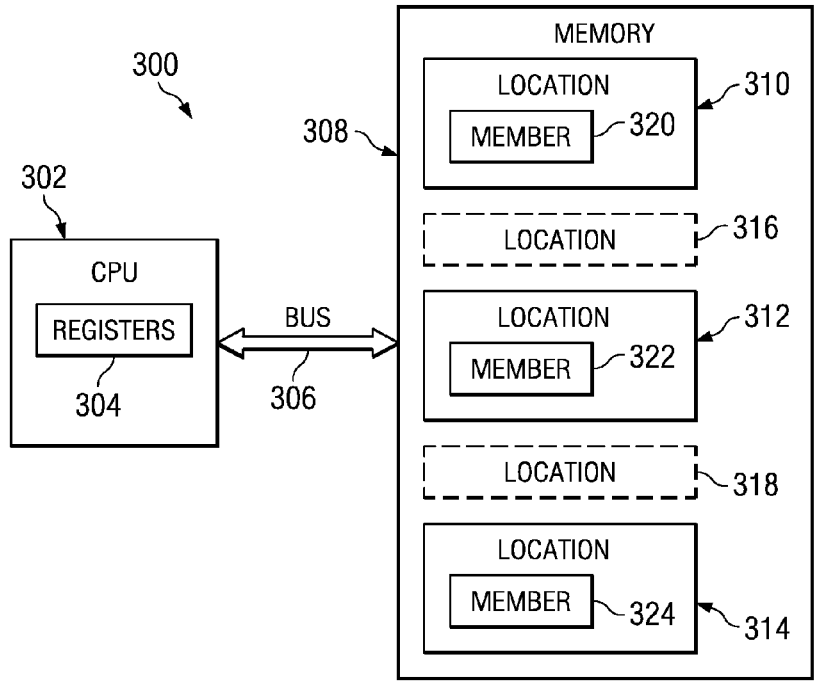
FIG. 3 is a block diagram of a data processing system in which illustrative embodiments may be implemented.

FIG. 3 is a block diagram of a data processing system in which illustrative embodiments may be implemented. Data processing system 300 can be any number of different data processing systems, including server 104, server 106, client 110, client 112, and client 114 in FIG. 1, or data processing system 200 in FIG. 2.

Data processing system 300 includes central processing unit (CPU) 302, which itself contains registers 304. A register is a small amount of very fast computer memory used to speed the execution of computer programs by providing quick access to commonly used values. Most, but not all, modern computer architectures operate on the principle of moving data from main memory into registers, operating on them, then moving the result back into main memory—a so-called load-store architecture.

Data processing system 300 also includes address bus 306 for transferring data between registers 304 and memory 308. Memory 308 is typically volatile memory, such as random access memory (RAM), but can also be other forms of memory, such as read only memory (ROM), a hard drive, or other forms of memory. In the illustrative example of FIG. 3, memory 308 is a random access memory.

Memory 308 is divided up into a number of locations, such as location 310, location 312, location 314, location 316, and location 318. Each location of memory is a group of associated memory address locations. A memory address location is a portion of memory associated with a particular memory address. Most forms of memory have many more locations than those shown in FIG. 3.

Registers 304 within central processing unit 302 give preference to certain locations in memory 308 when transferring data from registers 304 to memory 308. By giving preference to certain memory locations, the process of transferring data between registers 304 and memory 308 is made more efficient.

Additionally, if a particular register type, such as a floating point register, is used to load data from memory, the data should start only at certain addresses if access efficiency is to be maximized. The reason for this fact is that the connection of registers 304 to address bus 306 often ignores certain low order bits in order to reduce the number of gates. Accordingly, registers 304 are blind to certain starting point address locations within memory 308. These blind spots can be different for different register types.

Note that the term "blind," as used herein, does not mean that the register cannot see the address location. The register can use any starting point address, though some starting point addresses are very inefficient for certain processor designs. As used herein, the term "blind spot" refers to the starting point addresses in memory which are not preferred by the register.

Described differently, when a computer loads data from memory to a register, a chunk of data is loaded, as shown further in FIG. 6 through FIG. 9. For example, if the register is a floating point register, the chunk of data could be eight bytes long. The register may be configured in such a way that if the first byte of the chunk is address 1000, then access is very fast. (The number addresses described with respect to this example do not refer to reference numerals in the figures, but rather are non-limiting examples of memory addresses.) If the addresses are at 1008, 1016, etc., then access is also very fast. This type of access is aligned access. Thus, the floating point datum occupies address byte locations 1000 through 1007. However, if the first byte of this datum starts in address 1001, then access is unaligned. Therefore, the blind spot refers to the starting point address of a piece or chunk of data. The register can still see byte 1001; however, this byte is corresponding to the second byte of the register. For this reason, more work is needed for the processor to load the chunk if the byte address starts in address 1001. These concepts are explained more fully with regard to FIG. 6 through FIG. 9.

In the illustrative example of FIG. 3, locations 310, 312, and 314 are preferred locations in memory 308. In contrast, locations 316 and 318, shown in phantom, are blind spots in memory 308. Thus, when registers 304 cause data to be transferred via address bus 306 to memory 308, registers 304 preferentially cause the data to be stored in locations 310, 312, and 314.

However, in some cases, data is stored or must be stored in both preferred and non-preferred locations of memory, or is stored only in non-preferred locations of memory. Thus, for example, data may be stored in locations 316 and 318. In some cases, extra processor cycles are needed to access data lying in locations 316 or 318. In some other cases, access to data in locations 316 or 318 is prohibited.

As noted above, a set of data is usually stored in chunks, or subsets, of data, and each subset of data is stored at particular addresses within the memory. Each subset of data can also be referred to as a member. Members can be stored in different memory locations.

As also noted above, a set of data is aligned if no portion of a subset of the data is located in a blind spot, and a subset of data is aligned if no portion of the subset of data is located in a blind spot. Thus, for example, a set of data is considered aligned if all subsets of data can be found only in locations 310, 312, and 314. Stated differently, if all subsets of data are member 320, member 322, and member 324, then the entire set of data is considered aligned. Similarly, a subset of data is aligned if it is contained only in one of locations 310, 312, or 314.

A set of data is unaligned if any portion of any subset of data is located in a blind spot. Thus, for example, a set of data is unaligned if all subsets of data are located in locations 316 or 318.

A set of data is partially aligned if that set of data includes at least one subset of data for which no portion of that subset is in a blind spot of the registers of the central processing unit. Thus, for example, a set of data is partially aligned if one or more subsets of data are in locations 310, 312, or 314 and one or more additional subsets of data are in locations 316 or 318.

A set of data is poorly partially aligned if relatively few subsets of data of a set of data are aligned. A set of data is partially aligned well if relatively many subsets of data of a set of data are aligned.

Traditionally, alignment of all subsets of data is achieved by assuming the base address of the structure is zero, mapping the next subset of data onto the next available non-blind spot, and then leaving gaps within the memory, if needed. When allocating the structure variable, the structure variable is aligned according to the most stringent requirements of all subsets of data. All subsets of data will then be aligned properly. The set of data is then aligned, resulting in maximum processor efficiency when accessing the set of data or any subset of data.

However, this method of storing data is not always possible. For example, when a set of data is transported over a network the set of data is often compacted as tightly as possible. Data compacted for transfer over a network is most often poorly partially aligned and is sometimes unaligned. Additionally, when data is exchanged between two processes running on two different hardware architectures, the data must be organized or stored according to predetermined methods.

As a result, the set of data may be poorly partially aligned. Accordingly, a process may function less efficiently or not at all. As a result, performance of a process, software, or machine, in terms of the time required to execute a process, can be reduced by a factor of ten or more.

FIG. 4 through FIG. 9 illustrate prior art methods of storing data and subsets of data. FIG. 4 through FIG. 9 illustrate the problem of unaligned data access. Similar reference numerals throughout FIG. 4 through FIG. 9 refer to the same structures or concepts.

Figure 4:
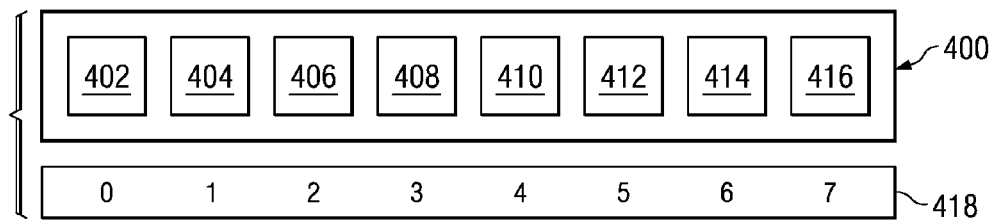
FIG. 4 is a first block diagram of a prior art memory.

FIG. 4 is a first block diagram of a prior art memory. Memory 400 can be memory 308 of FIG. 3. Memory 400 has a number of memory locations, including memory locations 402, 404, 406, 408, 410, 412, 414, and 416. Each of these memory locations can be one of memory locations 310, 312, 314, 316, or 318 of FIG. 3. Each memory location has an address associated with the corresponding memory location, as shown by set of addresses 418. Thus, for example, address 0 is associated with memory 402, address 1 is associated with memory 404, address 2 is associated with memory 406, address 3 is associated with memory 408, address 4 is associated with memory 410, address 5 is associated with memory 412, address 6 is associated with memory 414, and address 7 is associated with memory 416.

Those unfamiliar with processor architecture, including some programmers, often view storage of data according to the scheme shown in FIG. 4. Thus, for example, those unfamiliar with processor architecture often see each individual subset of data being stored at a particular memory address. However, for most modern processors, this view is not accurate.

Figure 5:
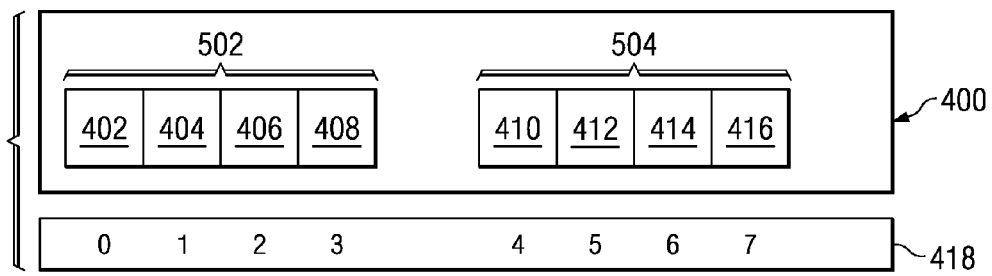
FIG. 5 is a second block diagram of a prior art memory.

FIG. 5 is a second block diagram of a prior art memory. Memory 400 can be memory 308 of FIG. 3. Memory 400 is associated with addresses, as shown in FIG. 4. Memory 400 in FIG. 5 is the same as memory 400 shown in FIG. 4.

Most modern processors do not access memory 400 one address at a time. Instead, most modern processors access "chunks" of data at a group of addresses in order to increase efficiency. Thus, for example, a processor may access data in addresses 0 through 3. Data in locations 402, 404, 406, and 408 thereby form chunk 502. Similarly, data in locations 410, 412, 414, and 416 thereby form chunk 504. Most modern processors will read and write from chunk 502 and/or chunk 504, not from individual memory locations 402 through 416.

Figure 6:
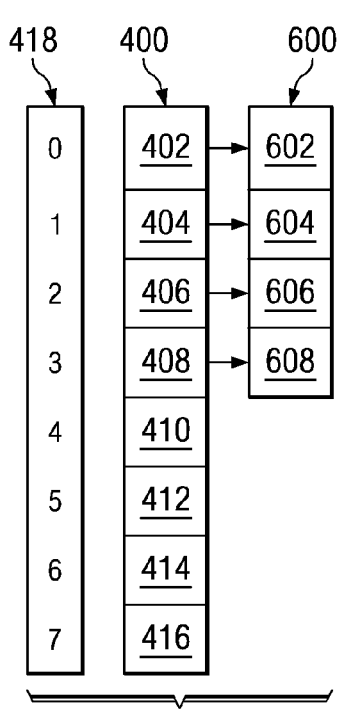
FIG. 6 is a third block diagram of a prior art memory.
Figure 7:
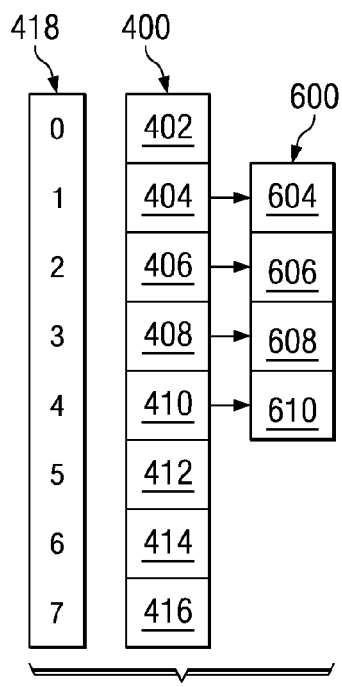
FIG. 7 is a fourth block diagram of a prior art memory.

FIG. 6 and FIG. 7 illustrate how data is transferred from memory to registers in the case that the processor does not access chunks of data. FIG. 6 and FIG. 7 illustrate a trivial case of memory transfer.

FIG. 6 is a third block diagram of a prior art memory. Memory 400 can be memory 308 of FIG. 3. Memory 400 is associated with addresses, as shown in FIG. 4. Memory 400 in FIG. 6 is the same as memory 400 shown in FIG. 4.

FIG. 6 illustrates how data might be transferred from memory 400 to registers 600 within a central processing unit (not shown) when data in memory locations 402 through 408 is to be transferred to registers 600. The process is simple, as each subset of data is transferred to a corresponding register. Thus, for example, data in location 402 is transferred to register 602, data in location 404 is transferred to register 604, data in location 406 is transferred to register 606, and data in location 408 is transferred to register 608.

FIG. 7 is a fourth block diagram of a prior art memory. Memory 400 can be memory 308 of FIG. 3. Memory 400 is associated with addresses, as shown in FIG. 4. Memory 400 in FIG. 7 is the same as memory 400 shown in FIG. 4. Registers 600 in FIG. 7 are the same as registers 600 shown in FIG. 6.

In the illustrative example of FIG. 7, a different set of data is to be accessed. This time, data in memory locations 404 through 410 are to be transferred into registers 600. Again, the process is simple because data in each memory location is transferred individually to registers 600. Thus, for example, data in location 404 is transferred to register 604, data in location 406 is transferred to register 606, data in location 408 is transferred to register 608, and data in location 410 is transferred to register 610.

Figure 8:
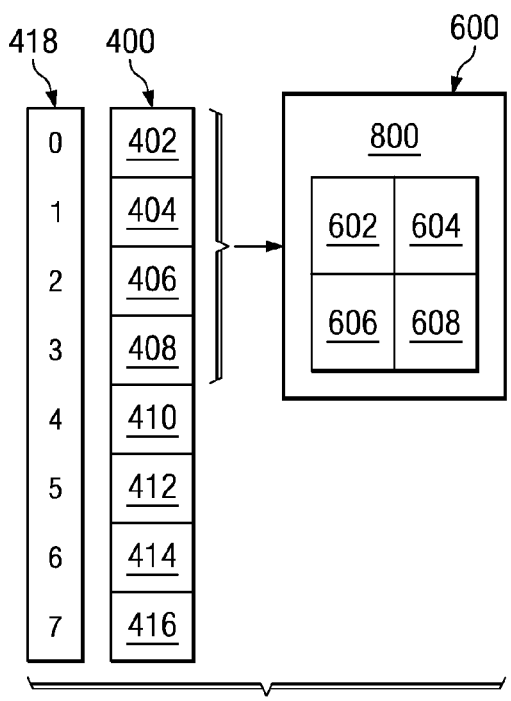
FIG. 8 is a fifth block diagram of a prior art memory.
Figure 9:
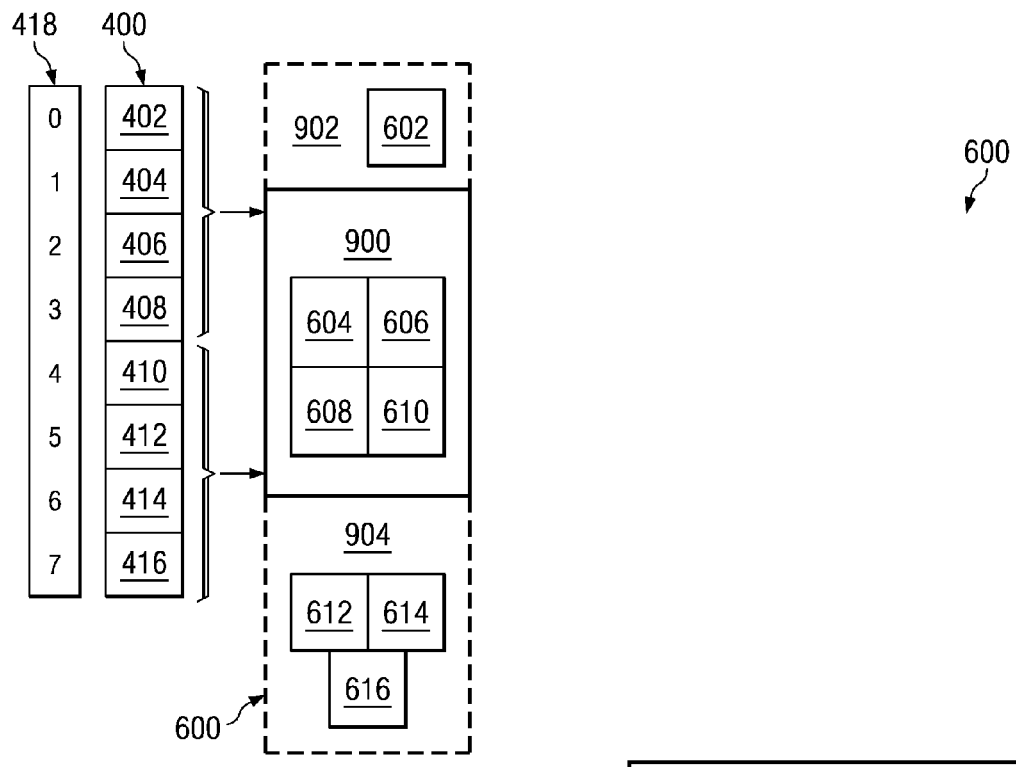
FIG. 9 is a sixth block diagram of a prior art memory.

FIG. 8 and FIG. 9 illustrate the difference between aligned access to memory and unaligned access to memory. Thus, FIG. 8 and FIG. 9 illustrate a difficulty that can arise when a processor attempts unaligned access of data.

FIG. 8 is a fifth block diagram of a prior art memory. Memory 400 can be memory 308 of FIG. 3. Memory 400 is associated with addresses, as shown in FIG. 4. Memory 400 in FIG. 8 is the same as memory 400 shown in FIG. 4. Registers 600 in FIG. 8 are the same as registers 600 shown in FIG. 6. The memory access shown in FIG. 8 is an aligned memory access.

In the illustrative example of FIG. 8, the processor attempts to transfer a chunk of data, as shown by the bracket, from memory 400 to registers 600. Thus, data 800 contained within registers 600 includes all data in memory locations 402, 404, 406, and 408. The access to memory 400 is considered aligned because all subsets of data to be transferred to registers 602, 604, 606, and 608 are in the same chunk, namely chunk 502 (FIG. 4) comprising memory locations 402, 404, 406, and 408.

FIG. 9 is a sixth block diagram of a prior art memory. Memory 400 can be memory 308 of FIG. 3. Memory 400 is associated with addresses, as shown in FIG. 4. Memory 400 in FIG. 8 is the same as memory 400 shown in FIG. 4. Registers 600 in FIG. 8 are the same as registers 600 shown in FIG. 6. The memory access shown in FIG. 9 is an unaligned memory access.

In the illustrative example of FIG. 9, the processor is only attempting to transfer data in memory locations 404, 406, 408, and 410 to register 600. However, the processor must access data in chunks. In particular, the processor must transfer data in memory locations 402 through 408 as one chunk and must transfer data in memory locations 410 through 416 as a second chunk, as shown by the dual brackets. As a result, registers 600 contain all data contained in memory locations 402 through 416 in corresponding registers 602-616.

The memory access shown in FIG. 9 is considered an unaligned memory access. The memory access is unaligned because the desired subset of data is in two chunks.

However, the processor is only to use data 900, which is the subset of data contained in memory locations 404, 406, 408, and 410. Data 902 and data 904 can each be made of further subsets of data. Data 902 from memory location 402 and data 904 from memory locations 412 through 416 are superfluous. As a result, the processor wastes available processing cycles in dealing with the superfluous data. This waste of processing cycles is referred to as a cost.

Figure 10:
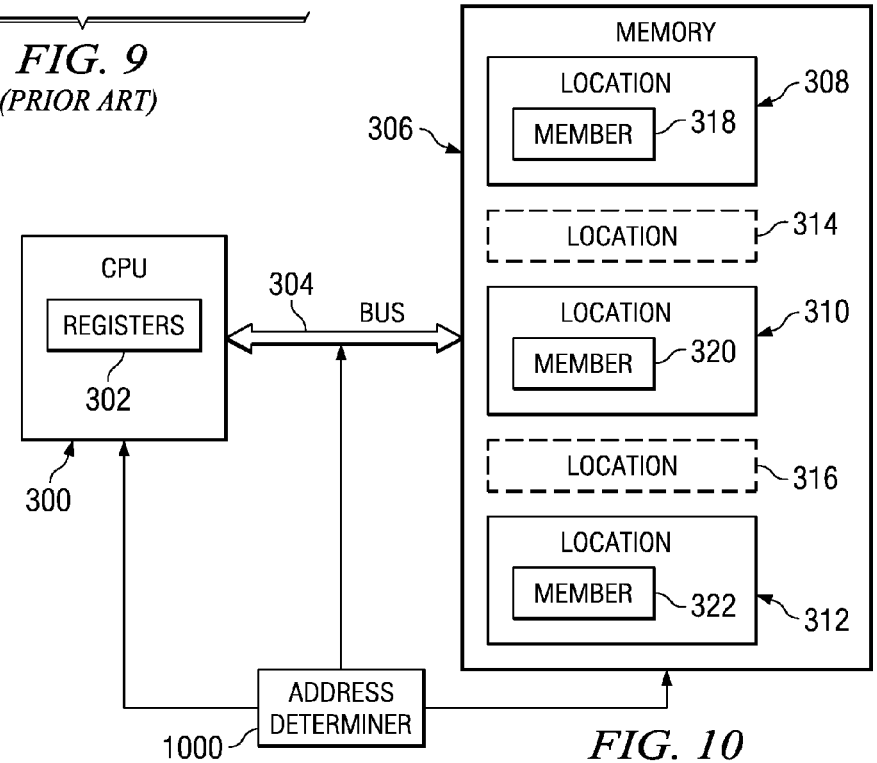
FIG. 10 is a block diagram of a data processing system including an address determiner, in accordance with an illustrative embodiment.

FIG. 10 is a block diagram of a data processing system including an address determiner, in accordance with an illustrative embodiment. Data processing system 300 shown in FIG. 10 is the same as data processing system 300 shown in FIG. 3. However, data processing system 300 is associated with address determiner 1000, which operates to determine the starting address which will result in optimal partial alignment of a set of data stored in memory 308. Address determiner 1000 can be implemented using hardware, software, or a combination of hardware and software.

Optimal partial alignment is partial alignment of a set of data in a way that results in the most subsets of data being aligned within constraints of data mapping. In other words, given a set of data with a given mapping of its subsets of data to a memory, optimal partial alignment results when the starting address for the set of data results in the minimum number of unaligned subsets of data. Stated differently, given a structure with a certain member mapping, which cannot be changed, how should the structure's starting address be selected so as to minimize the number of unaligned members?

Address determiner 1000 operates by using an algorithm to determine the starting address of a set of data that results in optimal partial alignment. The algorithm is shown with respect to the flowcharts in FIG. 12 and FIG. 13. The algorithm operates based on the following principles. Again, the term "member" corresponds to a subset of data within a set of data.

In an illustrative example, member i has offset $off_i$. The variable $off_i$ is an offset of a member within a given set of data. Suppose also that the subset of data has $align_i$, which is an alignment for the subset of data. Thus, offset $off_i$ and alignment $align_i$ are given for a particular subset of data.

If the set of data starts at memory address b, then a set of simultaneous equations can be setup as follows:

$$b + off_i = align_i * m_i + e_i \quad (1)$$

Where b, $m_i$, and $e_i$ are non-negative integers. The variable $m_i$ is some integer representing a member and $e_i$ is the alignment error for the $i^{th}$ member. Thus, equation (1) represents a set of equations with i running across all members.

In equation (1), a set of data, or block of data, is known and this set of data is desired to be placed into memory so that the program can process the set of data. This processing accesses the data field, or members, within this set of data. A starting address should be chosen for this set of data. The term starting address is used because the block of data can be many bytes long, and the starting address is the address of the first byte of this block.

If the starting address of the whole block is b, then member i is at address $b+off_i$, where $off_i$ is the offset. The offset is the distance in bytes from the first byte of the whole block to the member i. Each member has a certain alignment requirement, specified by $align_i$. In other words, the member i can be accessed most efficiently if the address of member i is at a multiple of $align_i$. This multiple is expressed by $align_i * m_i$.

However, this alignment cannot always be achieved for all members for a given starting address b for the whole data block. The error with respect to the alignment requirement for member i is represented by $e_i$.

Equation (1) therefore establishes the relationship between the starting address, b, of the whole structure with the address of each of its members. The value of $e_i$, the error in alignment, should be as close to the value zero, resulting from alignment for each member, for as many members as possible. The method for accomplishing this goal is described herein. In particular, equation (1), in conjunction with the other equations given below, is a general way of describing this problem precisely in order to provide information to programmers to implement the illustrative embodiments.

Without loss of generality, a cost function, f, can be assigned to denote the penalty, or additional cost, of unaligned access. In this case, $f(e_i)$ represents the additional cost for accessing member i for an alignment error $e_i$. To simplify the initial analysis, the penalty is assumed to be independent of data type, which is not always the case. When the penalty is independent of data type, then:

$$cost = f(e_1) + f(e_2) + \ldots \quad (2)$$

Hence, mathematically, the problem is reduced to minimizing equation (2) with variables satisfying equation (1) subject to the additional constraints of equation (3):

$$m_i \geq 0 \text{ and } e_i \geq 0. \quad (3)$$

Equation (2) explains how to use the error term $e_i$ in equation (1). If $e_i$ is zero, the access to member i is most efficient. If $e_i$ is not zero, then the access to member i will take more time. This additional time is called the access penalty. On some hardware, this access penalty is constant for all unaligned access. For example, an increase of 30% of the access time for all accesses for a non-zero $e_i$ could exist.

However, in the general case the penalty depends on $e_i$. In this case a smaller $e_i$ might incur a smaller penalty, for example. A mathematical function f( ) can be used to represent this penalty, and the penalty is represented by $f(e_i)$ for member $e_i$. If f(0) is zero, the total penalty of accessing the members is the sum total of all the penalties. The left-hand side, cost, in equation (2) represents this sum total. In these illustrative examples, a value for b is found in equation (1) so that cost in equation (1) is a minimum.

Equation (3) expresses the fact that the variables $m_i$ and $e_i$ are positive integers.

The system of equations in (1) is solvable. Thus, by setting b to zero, $m_i$ and $e_i$ are then the quotient and remainder of $off_i / align_i$. Under these circumstances, the following theorem can be stated:

[Begin Theorem] Let A be the least common multiple of $align_i$ for all i. Let $b_0$ (substituting the variable b) be a solution to equation (1). Then, $b_0 + A$ is also a solution to equation (1). Additionally, the set of $e_i$ remains the same in the new solution of $b_0 + A$, such that the cost for $b_0$ is the same for $b_0 + A$. [End Theorem]

In practice, using a general cost function such as f, which could be non-linear, is not necessary. Thus, the optimization can be changed as follows: Introduce slag variables $s_i$ and weight variables $w_i$ for the member i. A slag variable is a variable added to a set of equations. A slag variable has a value of either 0 or 1. Usually, the purpose of a slag variable is to simplify a set of equations. A weight variable represents a number that relates to how often a particular subset of data is accessed. If a subset of data is accessed frequently, then a weight variable can be a high number. Similarly, if a subset of data is accessed infrequently, then a weight variable can be a low number. The weight variable thus is used to adjust a probability of whether a particular subset of data is to be designated as aligned when the starting address for the set of data is determined.

The value of $s_i$ can be zero or one, indicating whether a weight variable is needed. In this case, variable $e_i$ can be re-written as $(s_i*E_i)$ and function $f(e_i)$ can be re-written as $(s_i*w_i)$. Note that $f()$ is a general function and can take many forms depending on the hardware. $s_i*w_i$ is one form of this function.

In one case, variable $e_i$ can be re-written as $(s_i*E_i)$ and function $f(e_i)$ can be re-written as $(s_i*w_i)$. In other words, $s_i$ is used to indicate whether an alignment error exists. If an alignment error exists, then the magnitude is indicated by $E_i$, with an associated cost $w_i$. If integral values for $w_i$ are used, then the system of equations can be written as:

$$b + \text{off}_i = \text{align}_i * m_i + s_i * E_i \qquad (1')$$

$$\text{cost} = s_1 * w_1 + s_2 * w_2 + \ldots \qquad (2')$$

Equations (1') and (2') are derived from equations (1) and (2), using the slag variable $s_i$ above. The purpose of these equations is to simplify equations (1) and (2) in order to more easily understand and describe the solution.

In equations (1') and (2') all quantities except $w_i$ are integers. In most cases, $w_i$ are integers; however, in the general case $w_i$ need not be integers. The cost in these equations can be minimized, subject to the constraints of $m_i \geq 0$, $E_i \geq 0$, and $1 \geq s_i \geq 0$. These constraints correspond to equation (3), which provides that the variables $m_i$, $E_i$ and $s_i$ are non-negative integers, and that $s_i$ has value either 0 or 1. The weights $w_i$ encapsulate the relative importance of individual members in terms of alignment. Therefore, the starting address for the set of data can be assigned based on profile directed feedback to collect information about the relative access frequencies of the members. Members that are accessed more frequently receive a larger $w_i$.

Figure 12:
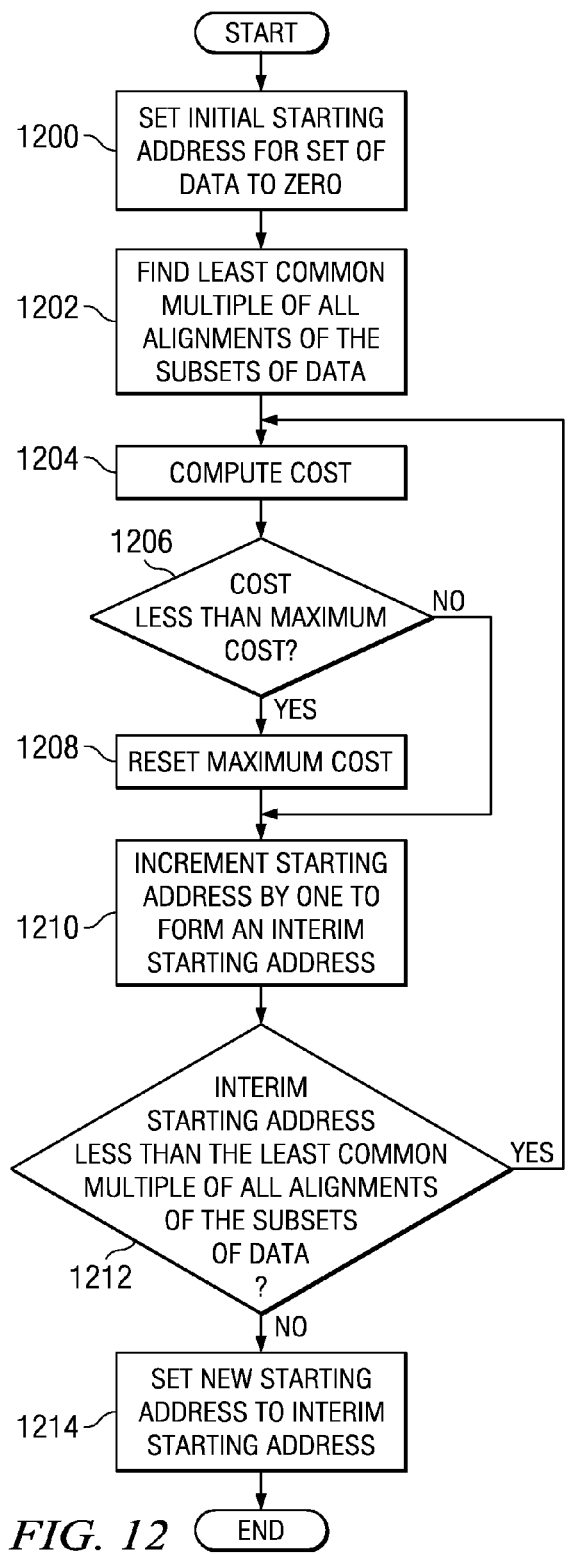
FIG. 12 is a flowchart of an algorithm for determining a starting memory address for optimal partial alignment of a set of data, in accordance with an illustrative embodiment.
Figures 13, 14:
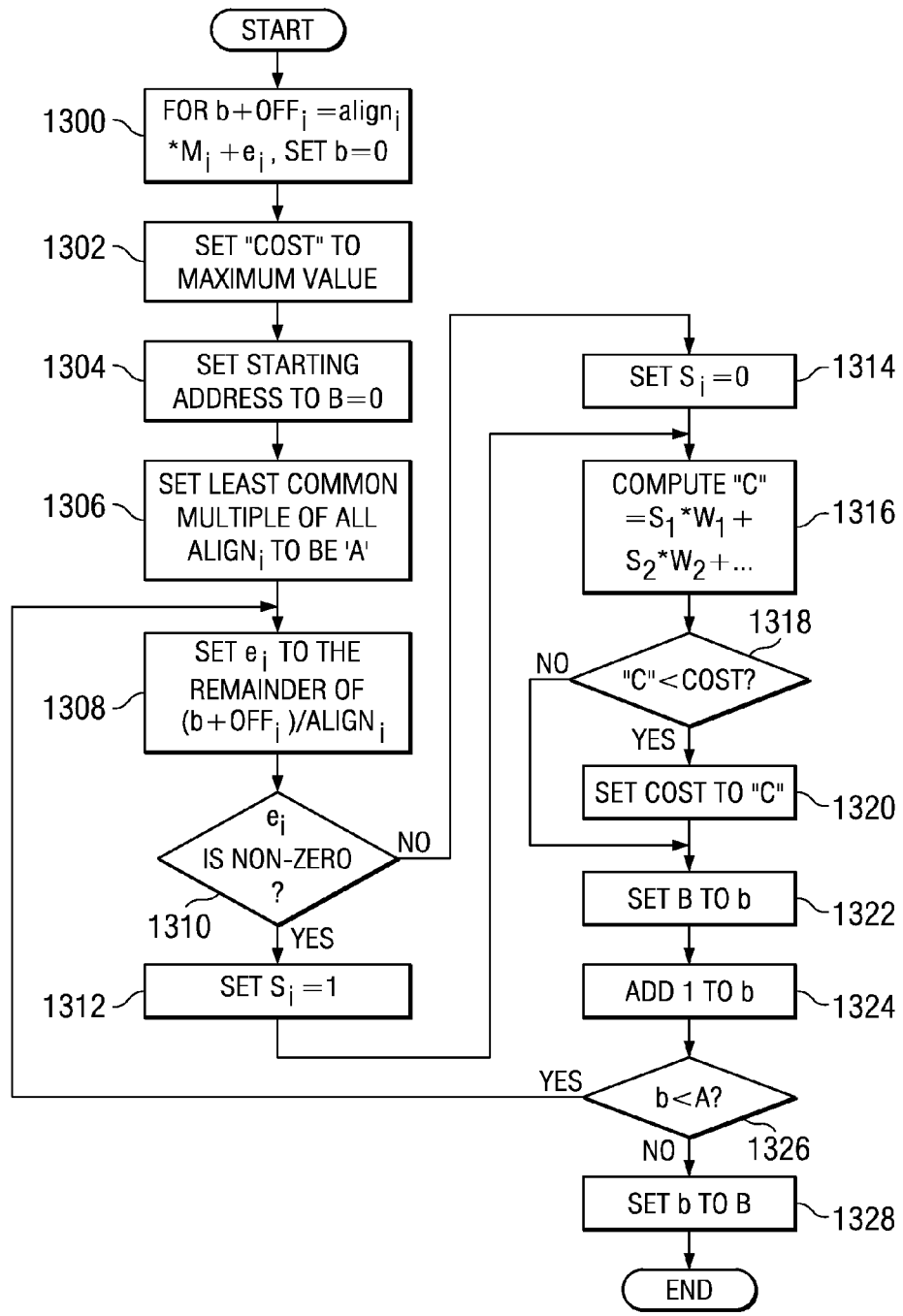
FIG. 13 is a flowchart of an algorithm for determining a starting memory address for optimal partial alignment of a set of data, in accordance with an illustrative embodiment.
FIG. 14 is pseudo code for which optimal partial alignment of a set of data can be performed, in accordance with an illustrative embodiment.

Thus, this method of determining a starting address to optimize partial alignment of a set of data can be used to maximize alignment for those subsets of data that are accessed most frequently. Typically, a rule of thumb is that eighty percent of access requests to a set of data are to twenty percent of the total data. Thus, those subsets of data that are accessed most frequently should be aligned, if possible, to optimize the partial alignment of the set of data. An example algorithm to determine this starting address is shown in FIG. 12 and FIG. 13.

In addition to optimizing alignment for sets of data, arrays of sets of data can also be optimally partially aligned in a similar manner. For example, if A is the least common multiple of all $\text{align}_i$ (recall $\text{align}_i$ is an alignment for the subset of data) then padding can be added to the end of the set of data so that the total size of the set of data is a multiple of A. For an array of such a set of data, the optimal partial alignment of the set of data also applies to that of the array.

Figure 11:
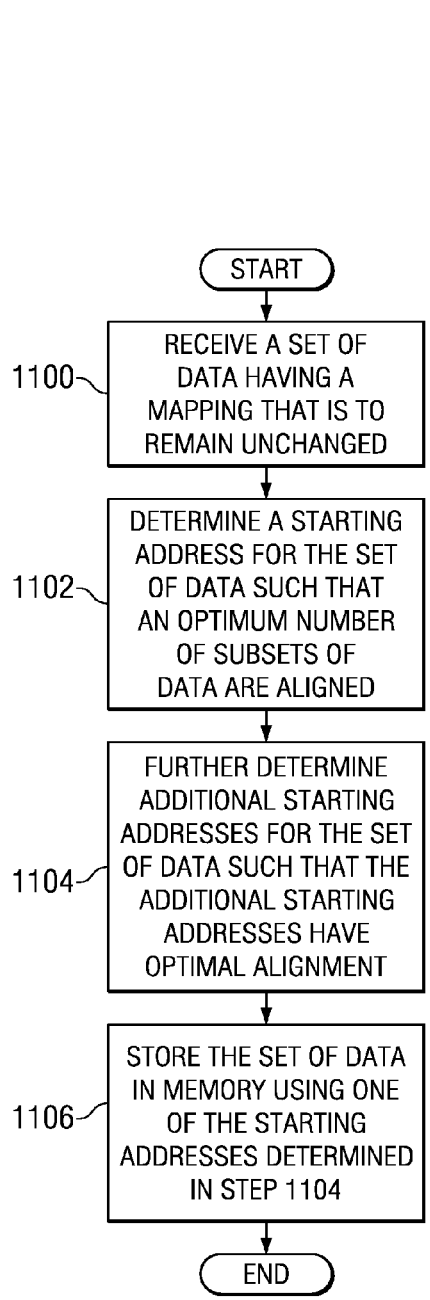
FIG. 11 is a flowchart of method for optimally aligning subsets of data for a set of data which has a mapping to memory, where the mapping is not changed.

FIG. 11 is a flowchart of a method for optimally aligning subsets of data for a set of data which has a mapping to memory, where the mapping is not changed. The process shown in FIG. 11 can be implemented in a data processing system, such as but not limited to server 104, server 106, client 110, client 112, and client 114 in FIG. 1, data processing system 200 in FIG. 2, or data processing system 300 shown in FIG. 3 and FIG. 10. The process shown in FIG. 11 can be implemented using an address determiner, such as address determiner 1000 shown in FIG. 10.

The process begins as an address determiner receives a set of data having a mapping that is to remain unchanged (step 1100). The set of data is made of a number of subsets of data. The mapping describes in what order the subsets of data are to be stored in a memory. The mapping further describes offsets of the groups of subsets of data in the memory. The mapping is not changed when the set of data is ultimately stored in the memory.

Next, the address determiner determines a starting address for the set of data such that an optimum number of subsets of data are aligned (step 1102). The starting address corresponds to an address in the memory. As used herein, the term "optimum number of subsets of data in the subsets of data are aligned" refers to an alignment that is a solution to equations (1) and (2). In some instances, an "optimum number" means that the maximum possible number of subsets of data are aligned. In other instances, an "optimum number" means that fewer than a maximum possible number of subsets of data are aligned, but where certain frequently accessed subsets of data are preferentially aligned.

As described above, a subset of data is aligned if no portion of the subset of data is located in a blind spot in the memory. A set of data is aligned if no portion of a subset of the data is located in a blind spot in the memory. A location in a memory is a blind spot if registers of an associated central processing unit preferentially do not access the location in the memory.

The starting point addresses can be determined according to the equation $B = b + n*A$ for $n = 1, 2, 3, \ldots$. That is, a series of addresses exists which can be used as the starting address, wherein each member of the series of addresses give the same optimum alignment. In this equation, B is a determined starting address, b is an initial starting address, n is a positive integer, and A is the least common multiple of all alignments of subsets of data in the set. The set of data can be an array of data.

The equation $B = b + n*A$ relates to equation (1) in that this equation tries to find b so that the cost in equation (2) is minimum. In this manner the access cost for accessing the structure members is minimized. This equation shows that the illustrative algorithm can give a series of b values, all of which give the same minimum cost. Thus, the structure can be selectively placed in a number of addresses, often many addresses. If $b_0$ is the smallest b value in equation 1 which gives minimum cost, then this equation, $B = b_0 + n*A$, gives b values by substituting n with a positive integer, such as 1, 2, 3, etc.

Additionally, the variable b, the initial starting address, is determined by an algorithm. An example algorithm for determining the variable b is shown in FIG. 13. In FIG. 13, the value of b is the value determined in step 1328. After the value of b is obtained, the equation stated in the previous paragraph can be used to generate additional addresses that provide the same optimal alignment. The additional addresses provide additional flexibility to address determiner 1000 in FIG. 10 for placing a data structure within a memory.

Returning to the process of FIG. 11, the address determiner further determines additional starting addresses for the set of data such that the additional starting addresses have optimal alignment (step 1104). The address determiner can use the equation $B = b + n*A$ to make this determination. The at least one frequently-accessed subset of data is at least one subset of data in the number of subsets of data. Finally, the address determiner causes the processor to store the set of data in the memory using one of the starting addresses determined in step 1104 (step 1106), with the process terminating thereafter.

FIG. 12 is a flowchart of an algorithm for determining a starting memory address for optimal partial alignment of a set of data, in accordance with an illustrative embodiment. The process shown in FIG. 12 can be implemented in a data processing system, such as but not limited to server 104, server 106, client 110, client 112, and client 114 in FIG. 1, data processing system 200 in FIG. 2, or data processing system 300 shown in FIG. 3 and FIG. 10. The process shown in FIG. 12 can be implemented using an address determiner, such as address determiner 1000 shown in FIG. 10.

The process begins as the address determiner sets an initial starting address for a set of data to be zero (step 1200). The address determiner then finds a least common multiple of all alignments of the subsets of data within the set of data (step 1202). The address determiner then computes a cost associated with the corresponding partial alignment or unalignment (step 1204).

The address determiner determines whether the cost of partial alignment or unalignment is less than a maximum cost (step 1206). The resulting cost is a determined cost. The maximum cost is a predetermined cost that represents the best estimate of the maximum cost that will be imposed on a processor as a result of partial alignment or unalignment. If the determined cost is less than the maximum cost, then the address determiner resets the maximum cost to the determined cost (step 1208). The address determiner then increments the starting address by one to form an interim starting address (step 1210).

Returning to step 1206, if the address determiner determines that the determined cost is not less than the maximum cost, then the address determiner increments the starting address by one to form an interim starting address (step 1210). The address determiner then determines whether the interim starting address is less than the least common multiple of all alignments of the subsets of data (step 1212). If the starting address is less, then the process returns to step 1204 and the process repeats. If the starting address is not less than the least common multiple of alignments of the subsets of data, then the address determiner sets the final, or new, starting address to the current value of the interim starting address (step 1214). The process terminates thereafter.

FIG. 13 is a flowchart of an algorithm for determining a starting memory address for optimal partial alignment of a set of data, in accordance with an illustrative embodiment. The process shown in FIG. 13 can be implemented in a data processing system, such as but not limited to server 104, server 106, client 110, client 122, and client 114 in FIG. 1, data processing system 200 in FIG. 2, or data processing system 300 shown in FIG. 3 and FIG. 10. The process shown in FIG. 13 can be implemented using an address determiner, such as address determiner 1000 shown in FIG. 10. The process shown in FIG. 13 is a more detailed example of the process shown in FIG. 12.

The process begins as the address determiner determines a result for the equation $b+off_i=align_i*m_i+e_i$ when $b=0$ (step 1300). The variable b is the current starting address of the set of data. The variable $off_i$ is the offset of a subset of data within the set of data. The variable $align_i$ is the alignment requirement for the subset of data, $m_i$ is the $i^{th}$ member, and $e_i$ is the alignment error associated with the subset of data.

Next, the address determiner sets the value of variable COST to a maximum value (step 1302). The address determiner sets the interim starting address, B, to zero (step 1304). The address determiner also sets the least common multiple of all $align_i$ to be A (step 1306). The address determiner also sets $e_i$ to the remainder of $(b+off_i)/align_i$ (step 1308). These steps, 1302 through 1308, can be performed in any order.

A series of values is found for b in equation (1) so that the COST in equation (2) is a minimum. The fact that there exists more than one value for b which gives the same minimum cost is known. This fact is proved by the theorem described above.

The calculations in the previous paragraph find the first such b. After finding the first b, the other values of b, which also give the same minimum cost, can be derived.

The address determiner then determines whether $e_i$ is non-zero (step 1310). If $e_i$ is non-zero, then the address determiner sets $s_i$ to 1 (step 1312). Here, $s_i$ is a slag variable associated with the $i^{th}$ member. If $e_i$ is zero, then the address determiner sets $s_i$ to 0 (step 1314). In either case, whether $e_i$ is non-zero or is zero, the address determiner determines an interim cost, c. The interim cost is $c=s_1*w_1+s_2*w_2+\ldots$ (step 1316).

In this case, c is the cost corresponding to equation (3) above. At this point a value of b is being found for equation (1) so that the cost in equation (2) is a minimum. At this stage of the algorithm, an interim value is obtained. A test will then be performed to determine if the cost is lower than the one obtained so far. The exemplary algorithm at this stage is in the middle of a number of iterations, or loops, which successively obtains smaller and smaller values for the cost.

The address determiner then determines whether the interim cost, c, is less than the maximum cost, COST (step 1318). If c<COST, then the address determiner resets the value of COST to c (step 1320). The address determiner then sets the value of B, the interim starting address, to b, the current starting address (step 1322). The address determiner also increments b (step 1324). In this illustrative embodiment, the value of b is incremented by 1. Returning to step 1318, if c≧COST, then the address determiner also increments b (step 1324). These calculations, together with the calculation for the variable c above, are designed to find the minimum cost. The two conditions, checking for c<COST and c≧COST, are used to determine if a smaller cost can be found.

The address determiner then determines whether b, the current starting address, is less than A, the least common multiple of all $align_i$ (step 1326). If b<A, then the process returns to step 1308 and the process repeats. If b≧A, then the address determiner sets b, the current starting address, to the value of B, the interim starting address (step 1328).

This value of b is the optimal starting address, $b_0$, that is sought. In this manner, the address determiner has determined the starting address of the set of data to achieve optimal partial alignment of the set of data. The process terminates thereafter. Note that this method fits naturally in a profile-directed feedback setup.

Thus, the set of data is aligned on $b_0+n*A$, for n=1, 2, 3 . . . . This method can be the same as a traditional method of forcing alignment of the set of data, wherein all subsets of data are aligned, if $b_0$ is zero, $align_i$ divides $offset_i$ for all i, and A is the alignment of the subset of data having the most stringent requirements.

FIG. 14 is pseudo code for which optimal partial alignment of a set of data can be performed, in accordance with an illustrative embodiment. The pseudo code shown in FIG. 14 can be implemented in a data processing system, such as but not limited to server 104, server 106, client 110, client 122, and client 114 in FIG. 1, data processing system 200 in FIG. 2, or data processing system 300 shown in FIG. 3 and FIG. 10. The address determiner shown in FIG. 10 and the algorithms shown in FIG. 12 and FIG. 13 can be used in conjunction with the pseudo code shown in FIG. 14 to achieve optimal partial alignment of sets of data defined by or created by the pseudo code in FIG. 14.

The pseudo code shown in FIG. 14 is a packed structure. Thus, the sets of data defined by the pseudo code are not likely to be aligned, as subsets of data are aligned to byte boundaries and not to offset boundaries. The alignment for the term "char" is byte, and for the term "int" the alignment is word. If the variable "x" is aligned on a byte boundary, then variable "m2" is unaligned. Likewise, if "x" is aligned on a word boundary, then variable "m2" is unaligned. However, if the variable "x" is placed on a starting address of 4*n−1, for n=1, 2, 3, . . . , then all members are aligned. In this case, no need exists to trade memory space efficiency with performance efficiency. However, in many cases, satisfying the alignment requirements for all members is not possible.

Illustrative embodiments provide for a computer-implemented method for performing partial alignment of a set of data. A start address of the set of data to be stored in a memory is set to zero. A least common multiple of all alignments of all members is determined, wherein each member is a subset of data in the set of data. A cost of unaligned access of the set of data is computed. Responsive to the cost of unaligned access being more than a maximum cost of unaligned access, the start address is incremented to form an incremented start address. Responsive to the incremented start address being less than the least common multiple, the incremented starting address is set as an actual start address. The set of data is then stored in the memory. The set of data has the actual start address, whereby partial alignment of the set of data is achieved.

The illustrative embodiments overcome a number of problems associated with known methods of storing data in a memory when the data is desired to be stored as unaligned or partially aligned data. For example, by selecting a starting address to optimize partial alignment of a set of data, those subsets of data that are accessed most frequently can be aligned. Thus, the registers of the central processing unit can more efficiently access the set of data compared to if the set of data had been stored without optimizing partial alignment of the set of data. As a result, a balance is achieved between performance of a processor when accessing a set of data and compact storage of the set of data. Similarly, the illustrative embodiments result in a method of partial alignment of a set of data that maximizes performance without forcing gaps between subsets of data, where the gaps may interfere with other processing requirements.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method comprising:
receiving a set of data having a mapping, wherein the set of data comprises a plurality of subsets of data, wherein the mapping describes in what order the plurality of subsets of data are to be stored in a memory, and wherein the mapping further describes offsets of the plurality of subsets of data in the memory;
determining a starting address for the set of data, wherein the starting address corresponds to an address in the memory, and wherein the starting address is determined such that at least one frequently-accessed subset of data will be aligned, wherein the at least one frequently-accessed subset of data comprises at least one subset of data in the plurality of subsets of data; and
storing the set of data in the memory, wherein the mapping is unaffected when the set of data is stored in the memory.

2. The computer-implemented method of claim 1 wherein the starting point address is determined according to the equation B=b+n*A for n=1, 2, 3, . . . , wherein B is a determined starting address, wherein b is an initial starting address, wherein n is an integer, and wherein A is a least common multiple of all alignments of the subsets of data.

3. The computer-implemented method of claim 1 wherein the set of data comprises an array.

4. The computer-implemented method of claim 3 further comprising:
adding additional data to the set of data such that a size of the set of data is a multiple of A, wherein A is an alignment for the set of data that is required for complete alignment of the set of data.

5. A computer-implemented method for performing partial alignment of a set of data, the computer-implemented method comprising:
setting to zero a start address of the set of data to be stored in a memory;

determining a least common multiple of all alignments of all members, wherein each member is a subset of data in the set of data;

computing a cost of unaligned access of the set of data;

determining whether the cost of unaligned access is more than or equal to a maximum cost of unaligned access;

responsive to the cost of unaligned access being more than or equal to a maximum cost of unaligned access, incrementing the start address to form an incremented start address;

responsive to the incremented start address being less than the least common multiple, setting the incremented start address as an actual start address; and storing the set of data in the memory, wherein the set of data has the actual start address, whereby partial alignment of the set of data is achieved.

6. The computer-implemented method of claim 5 further comprising:

responsive to the cost of unaligned access being less than a maximum cost of unaligned access, revising the maximum cost of unaligned access to be equal to the cost of unaligned access.

7. The computer-implemented method of claim 5 further comprising:

responsive to the incremented start address being less than the least common multiple, computing a second cost of unaligned access of the set of data.

8. The computer-implemented method of claim 7 further comprising:

repeating the step of incrementing and the step of setting using the second cost.

9. The computer-implemented method of claim 5 wherein the cost is associated with an error for each member according to the equation $e_i$=remainder of $(b+\text{offset}_i)/\text{align}_i$, wherein $e_i$ is an error associated with a member, b is a current starting address in the method, and wherein $\text{offset}_i$ and $\text{align}_i$ are determined according to a mapping associated with the set of data and data types associated with the set of data.

10. The computer-implemented method of claim 9 further comprising:

before the step of computing a cost, and responsive to $e_i$ being non-zero, setting a variable $s_i=1$, wherein $s_i$ is a slag variable; and computing the cost according to the equation $c=s_1*w_1+s_2*w_2+\ldots s_i*w_i$, wherein c is the cost and $w_i$ is a weight variable for an $i^{th}$ member.

11. The computer-implemented method of claim 9 further comprising:

before the step of computing a cost, and responsive to $e_i$ being zero, setting a variable $s_i=0$, wherein $s_i$ is a slag variable; and computing the cost according to the equation $c=s_1*w_1+s_2*w_2+\ldots s_i*w_i$, wherein c is the cost and $w_i$ is a weight variable for an $i^{th}$ member.

12. A computer program product comprising:

a computer usable medium having computer usable program code for performing partial alignment of a set of data, said computer program product including:

computer usable program code for setting to zero a start address of the set of data to be stored in a memory;

computer usable program code for determining a least common multiple of all alignments of all members, wherein each member is a subset of data in the set of data;

computer usable program code for computing a cost of unaligned access of the set of data;

computer usable program code for determining whether the cost of unaligned access is more than or equal to a maximum cost of unaligned access;

computer usable program code for, responsive to the cost of unaligned access being more than or equal to a maximum cost of unaligned access, incrementing the start address to form an incremented start address;

computer usable program code for, responsive to the incremented start address being less than the least common multiple, setting the incremented start address as an actual start address; and computer usable program code for storing the set of data in the memory, wherein the set of data has the actual start address, whereby partial alignment of the set of data is achieved.

13. The computer program product of claim 12 further comprising:

computer usable program code for, responsive to the cost of unaligned access being less than a maximum cost of unaligned access, revising the maximum cost of unaligned access to be equal to the cost of unaligned access.

14. The computer program product of claim 12 further comprising:

computer usable program code for, responsive to the incremented start address being less than the least common multiple, computing a second cost of unaligned access of the set of data.

15. The computer program product of claim 14 further comprising:

computer usable program code for repeating the step of incrementing and step of setting using the second cost.

16. The computer program product of claim 12 wherein the cost is associated with an error for each member according to the equation $e_i$=remainder of $(b+\text{offset}_i)/\text{align}_i$, wherein $e_i$ is the error associated with a member, b is a current starting address in the method, and wherein $\text{offset}_i$ and $\text{align}_i$ are determined according to a mapping associated with the set of data and data types associated with the set of data.

17. The computer program product of claim 16 further comprising:

computer usable program code for, before the step of computing a cost and responsive to $e_i$ being non-zero, setting a variable $s_i=1$, wherein $s_i$ is a slag variable; and computer usable program code for computing the cost according to the equation $c=s_1*w_1+s_2*w_2+\ldots s_i*w_i$, wherein c is the cost and $w_i$ is a weight variable for an $i^{th}$ member.

18. The computer program product of claim 16 further comprising:

computer usable program code for, before the step of computing a cost and responsive to $e_i$ being zero, setting a variable $s_i=0$, wherein $s_i$ is a slag variable; and computer usable program code for computing the cost according to the equation $c=s_1*w_1+s_2*w_2+\ldots s_i*w_i$, wherein c is the cost and $w_i$ is a weight variable for an $i^{th}$ member.

19. A data processing system comprising:

at least one processor;

a bus coupled to the at least processor;

a computer usable medium coupled to the bus, wherein the computer usable medium contains a set of instructions for performing partial alignment of a set of data, wherein the at least one processor is adapted to carry out the set of instructions to:

set to zero a start address of the set of data to be stored in a memory;

determine a least common multiple of all alignments of all members, wherein each member is a subset of data in the set of data;

compute a cost of unaligned access of the set of data;

determine whether the cost of unaligned access is more than a maximum cost of unaligned access;

responsive to the cost of unaligned access being more than a maximum cost of unaligned access, increment the start address to form an incremented start address;

responsive to the incremented start address being less than the least common multiple, set the incremented start address as an actual start address; and store the set of data in the memory, wherein the set of data has the actual start address, whereby partial alignment of the set of data is achieved.

* * * * *